US010107567B2

(12) United States Patent
Tucker et al.

(10) Patent No.: US 10,107,567 B2
(45) Date of Patent: Oct. 23, 2018

(54) VEHICLE HEAT EXCHANGER AIR GUIDE

(71) Applicant: DENSO International America, Inc., Southfield, MI (US)

(72) Inventors: Michael Tucker, Livonia, MI (US); Jeremy Koscielny, Brighton, MI (US)

(73) Assignee: DENSO International America, Inc., Southfield, MI (US)

( * ) Notice: Subject to any disclaimer, the term of this patent is extended or adjusted under 35 U.S.C. 154(b) by 72 days.

(21) Appl. No.: 14/995,281

(22) Filed: Jan. 14, 2016

(65) Prior Publication Data

US 2017/0204773 A1    Jul. 20, 2017

(51) Int. Cl.
  *F28F 9/00*   (2006.01)
  *F01P 7/02*   (2006.01)
  *B60K 11/08*  (2006.01)

(52) U.S. Cl.
  CPC .............. *F28F 9/002* (2013.01); *B60K 11/08* (2013.01); *F01P 7/02* (2013.01); *F28F 2280/06* (2013.01)

(58) Field of Classification Search
  CPC ........ F28F 2280/06; F28F 9/001; F28F 9/002; B60K 11/04; B60K 11/08; B60K 11/085; F01P 7/02
  USPC ....................................................... 180/68.4
  See application file for complete search history.

(56) References Cited

U.S. PATENT DOCUMENTS

| 5,269,367 | A  | * | 12/1993 | Susa ................. B60R 11/00 165/140 |
| 6,412,581 | B2 |   | 7/2002  | Enomoto et al. |
| 6,540,037 | B2 | * | 4/2003  | Sasano ................. B60K 11/08 180/68.1 |
| 6,672,416 | B1 | * | 1/2004  | Guyomard ............ B60K 11/04 180/68.4 |
| 6,802,361 | B2 | * | 10/2004 | Hatanaka ............... F24F 1/0011 165/53 |
| 6,883,589 | B2 |   | 4/2005  | Ozawa et al. |
| 8,931,584 | B2 |   | 1/2015  | Sasina et al. |
| 2001/0040021 | A1 |   | 11/2001 | Avequin et al. |
| 2002/0003034 | A1 |   | 1/2002  | Fukuoka et al. |
| 2013/0248272 | A1 | * | 9/2013  | Nakamura ............. B62K 11/02 180/229 |

FOREIGN PATENT DOCUMENTS

| GB | 2437141 B    | * | 7/2011  | ............. F24D 3/141 |
| JP | 2004301479 A | * | 10/2004 | ......... F28D 21/0003 |

OTHER PUBLICATIONS

Kamihiro, JP 2004-301479, Oct. 28, 2004, machine translation.*

* cited by examiner

*Primary Examiner* — Hung Q Nguyen
*Assistant Examiner* — Mark L Greene
(74) *Attorney, Agent, or Firm* — Harness, Dickey & Pierce, P.L.C.

(57) ABSTRACT

A heat exchanger assembly can include a support structure, a heat exchanger, and an air guide. The heat exchanger can be mounted to the support structure. The heat exchanger and the support structure can cooperate to define a gap. The air guide can block the gap to guide an airflow toward a core of the heat exchanger. The air guide can include a proximal end and a distal end. The proximal end can be coupled to the support structure. The distal end can extend a first distance from the proximal end in a first condition and can extend a second distance from the proximal end in a second condition. The second distance can be less than the first distance.

10 Claims, 4 Drawing Sheets

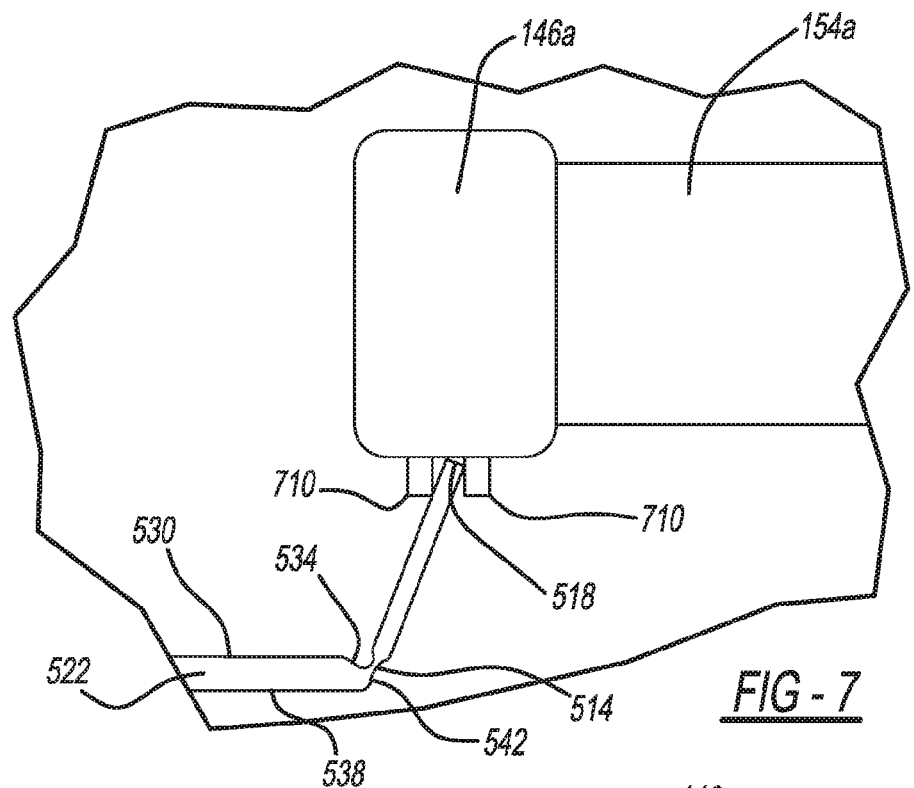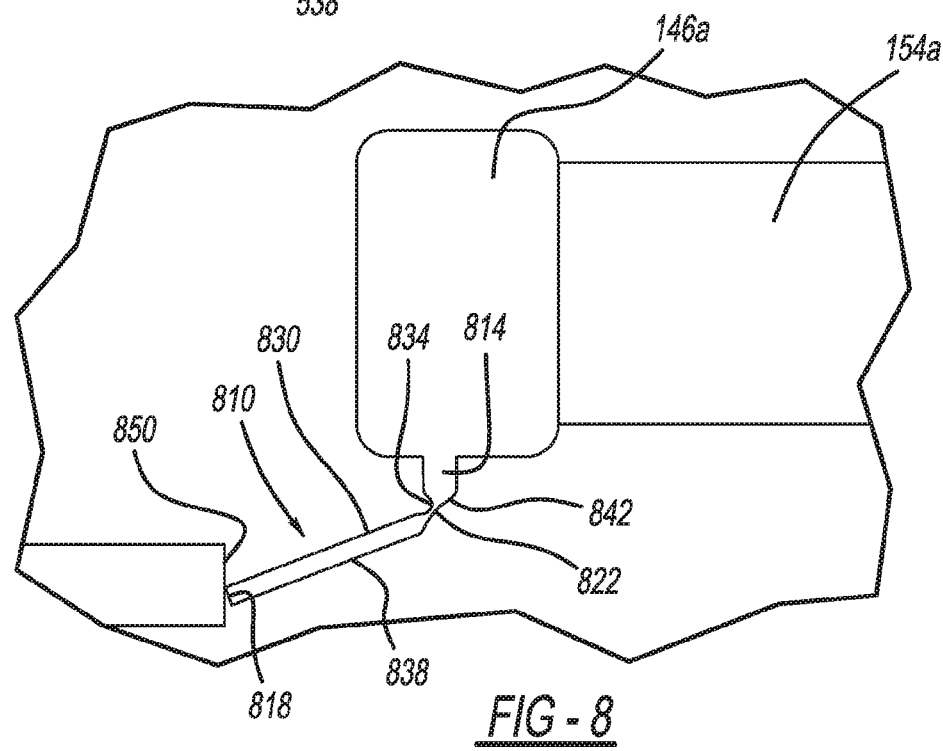

VEHICLE HEAT EXCHANGER AIR GUIDE

FIELD

The present disclosure relates to a vehicle heat exchanger air guide.

BACKGROUND

This section provides background information related to the present disclosure which is not necessarily prior art.

Vehicles typically include a cooling system with a heat exchanger (e.g., a radiator) configured to release heat from the engine to the atmosphere. The heat exchanger is typically mounted to a heat exchanger frame structure that can be separate from the vehicle's frame, or can be a part of the vehicle's frame. In some applications, different types of vehicles, or different configurations of the same vehicle can use similar heat exchanger frame structures, but require heat exchangers of different sizes. This variation in heat exchanger sizes can leave gaps between the heat exchanger frame structure and the heat exchanger, which can allow air to bypass the heat exchanger.

SUMMARY

This section provides a general summary of the disclosure, and is not a comprehensive disclosure of its full scope or all of its features.

The present teachings are directed towards an air guide for directing air to a heat exchanger of a vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a sectional view similar to FIG. 6, illustrating an air guide of a fourth construction; and FIG. 8 is a sectional view similar to FIG. 6, illustrating an air guide of a fifth construction.

Corresponding reference numerals indicate corresponding parts throughout the several views of the drawings.

DETAILED DESCRIPTION

Example embodiments will now be described more fully with reference to the accompanying drawings.

Figure 1:
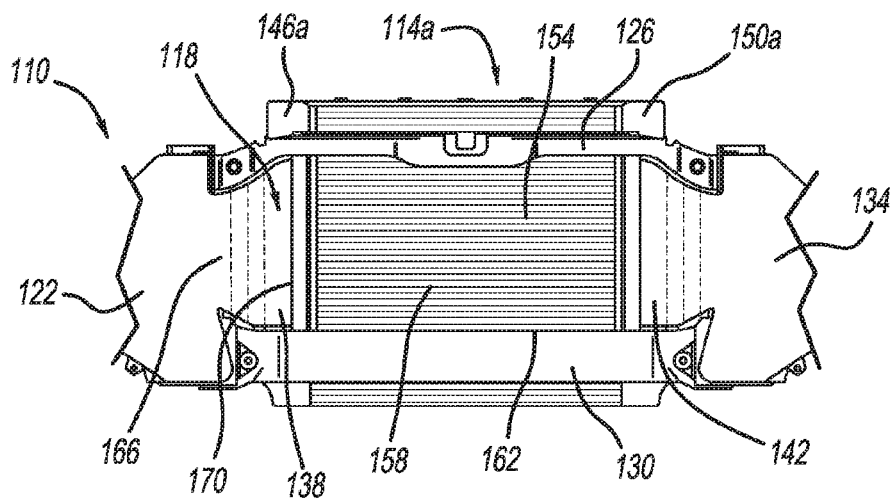
FIG. 1 is a front view of a heat exchanger mounted to a heat exchanger frame that includes an air guide of a first construction.

The present teachings are directed toward an air guide that directs airflow to a heat exchanger. The air guide can operate with heat exchangers of different sizes. With reference to FIG. 1, a support structure 110, a heat exchanger 114a, and an air guide system 118 are schematically illustrated. The support structure 110 can include a right frame 122, an upper center frame 126, a lower center frame 130, and a left frame 134. The air guide system 118 can include a right air guide 138 and a left air guide 142.

The heat exchanger 114a can be any suitable type of heat exchanger. The heat exchanger 114a can be constructed in a conventional manner and can be part of a cooling system, such as an engine cooling system, a transmission cooling system, or an intake cooling system for example. In the example provided the heat exchanger 114a is a vehicle radiator (e.g., part of an engine cooling system) and generally includes a right tank 146a, a left tank 150a, and a radiator core 154. The right tank 146a and the left tank 150a can each be hollow vessels configured to hold a coolant fluid (e.g., water, and/or refrigerant). The radiator core 154 can have a plurality of tubes 158 that couple the right tank 146a to the left tank 150a for fluid communication therebetween. A plurality of fins (not specifically shown) can extend between the tubes 158 to assist heat transfer from the tubes 158 to air that can flow between the tubes 158.

The right tank 146a and the left tank 150a can be coupled to a vehicle component (e.g., an engine, not shown) in a conventional manner. Briefly, the right and left tanks 146a, 150a can be coupled to the vehicle component (not shown) such that the fluid can flow or be pumped from the vehicle component (not shown), through one of the tanks 146a, 150a to the tubes 158, through the tubes 158, and from the tubes 158 through the other one of the tanks 146a, 150a and back to the vehicle component (not shown). The fluid can absorb heat from the vehicle component (not shown) and release the heat to air that can flow between the tubes 158, thus cooling the vehicle component (not shown).

The heat exchanger 114a can be supported by the right frame 122, the left frame 134, the upper center frame 126, and/or the lower center frame 130. In the example provided, the right tank 146a and the left tank 150a are mounted to the upper and lower center frames 126, 130, though other constructions can be used to mount the heat exchanger 114a to the right frame 122, the left frame 134, the upper center frame 126, and/or the lower center frame 130. The right frame 122, the left frame 134, the upper center frame 126, and the lower center frame 130 can cooperate to define a central aperture 162 of the support structure 110 that can align with the core 154 of the heat exchanger 114a. Air can flow through the aperture 162 to pass between the tubes 158 and cool the fluid flowing within the tubes 158.

The right frame 122 and the left frame 134 can be mounted to a vehicle chassis (not shown) or a vehicle body (not shown) to support the heat exchanger 114a within the vehicle (not shown). The right frame 122 and the left frame 134 can be similar in construction. The right air guide 138 and the left air guide 142 can be similar in construction.

The right air guide 138 can have a proximal end 166 and a distal end 170. The proximal end 166 can be coupled to the right frame 122 and the distal end 170 can extend therefrom toward a center of the heat exchanger 114a. In the example provided, the right frame 122 and the right air guide 138 are formed of a molded polymer material and are integrally formed together. Alternatively, the right frame 122 and the right air guide 138 can be formed of another suitable, rigid material, such as metal or composite for example. Alternatively, the proximal end 166 can be attached to the right air guide 138, such as by fasteners, welding, adhesive, or over-molding for example.

The right air guide 138 can have an upper and lower perimeter that follows the contour of the aperture 162 to span from the upper center frame 126 to the lower center frame 130. The right air guide 138 can overlap or abut the upper center frame 126 and the lower center frame 130. The distal end 170 of the right air guide 138 can terminate proximate to the right tank 146a and the core 154 to block the portion of the aperture 162 that would otherwise form an open gap between the heat exchanger 114a and the right frame 122.

Figure 2:
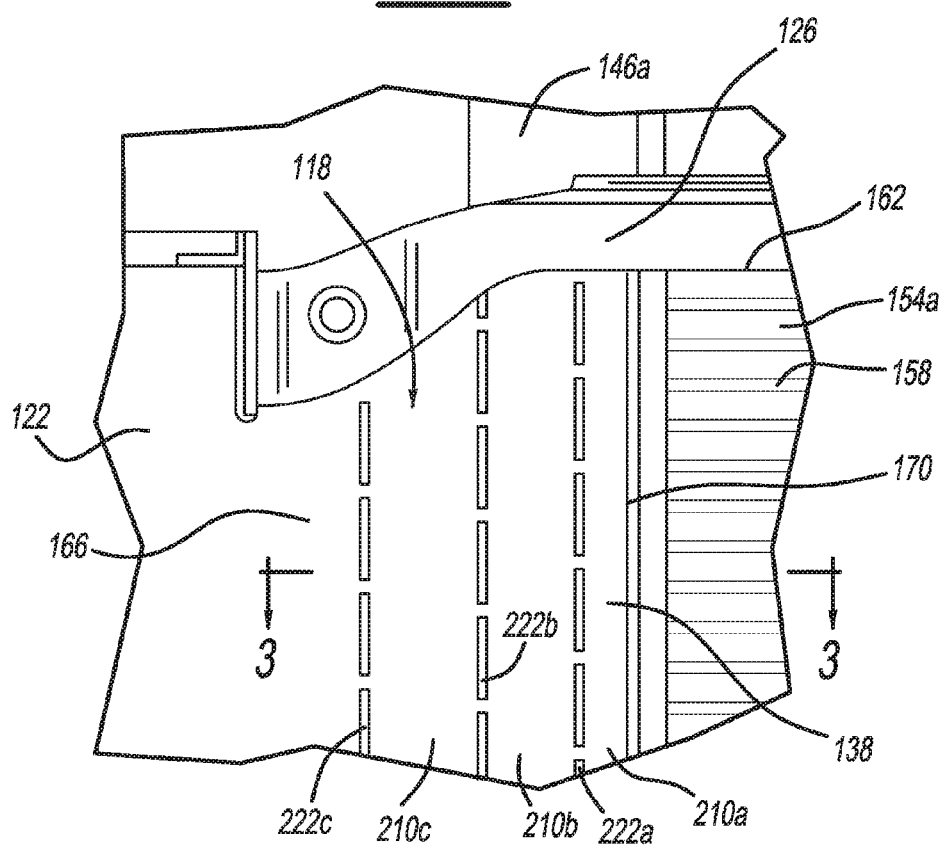
FIG. 2 is a front view of a portion of the air guide of FIG. 1.
Figure 3:
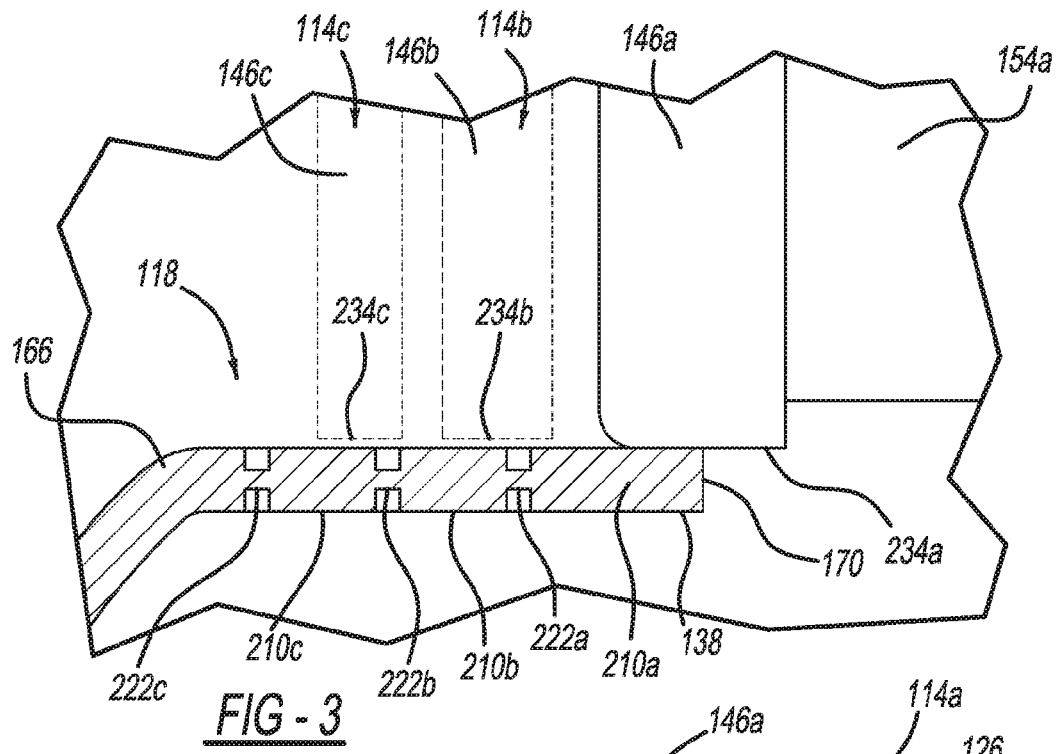
FIG. 3 is a sectional view of a portion of the air guide of FIG. 1, taken along line 3-3 shown on FIG. 2.

With additional reference to FIGS. 2 and 3, the right air guide 138 can include a plurality of breakout portions 210a, 210b, 210c. The breakout portions 210a, 210b, 210c generally extend between the upper and lower center frames 126, 130. The breakout portions 210a, 210b, 210c are separated by breakable regions 222a, 222b, 222c such that the breakout portions 210a, 210b, 210c can be easily broken off from the right air guide 138. For example, when the breakout portions 210a, 210b, 210c are all attached (i.e., in a first condition of the right air guide 138), the distal end 170 terminates at the free end of the breakout portion 210a. When the breakout portion 210a is removed (i.e., broken off; in a second condition of the right air guide 138), the distal end 170 terminates at the free end of the breakout portion 210b. When the breakout portion 210b is removed (i.e., broken off; in a third condition of the right air guide 138), the distal end 170 terminates at the free end of the breakout portion 210c. While three breakout portions 210a, 210b, 210c are shown, additional, or fewer breakout portions can be used.

In the example provided, each of the breakable regions 222a, 222b, 222c can be scored or include a series of thinner areas that are linearly spaced between the upper and lower center frames 126, 130. The thinner areas of the breakable regions 222a, 222b, 222c can be thinner than the breakout portions 210a, 210b, 210c. The areas linearly between the thinner areas of each breakable region 222a, 222b, 222c can be the same thickness as the breakout portions 210a, 210b, 210c, though other configurations can be used. In an alternative construction, not specifically shown, the thin areas can extend the entire length of each breakable region 222a, 222b, 222c.

Alternatively, the breakable regions 222a, 222b, 222c can be a series of perforations that are linearly spaced between the upper and lower center frames 126, 130 and penetrate through the right air guide 138 to permit the breakout portions 210a, 210b, 210c to be easily broken off.

In the example provided, the breakout portions 210a, 210b, 210c can be removed by repeatedly flexing the right air guide 138 along one of the breakable regions 222a, 222b, 222c, until that breakable region 222a, 222b, 222c breaks. Alternatively, the breakable region 222a, 222b, 222c can be frangible such that bending of the right air guide 138 along the breakable region 222a, 222b, 222c, greater than a predetermined angular amount breaks off the corresponding breakout portion 210a, 210b, 210c. Alternatively, the breakable regions 222a, 222b, 222c can permit the breakout portions 210a, 210b, 210c to be easily and accurately removed using a tool (not shown), such as a knife, or a punch for example. In the example provided, the process of removing one of the breakout portions 210a, 210b, 210c by breaking a corresponding breakable region 222a, 222b, 222c, is irreversible.

The removability of the breakout portions 210a, 210b, 210c, permits different sizes of heat exchangers to be used with the same support structure 110. As shown in FIG. 3, with all of the breakout portions 210a, 210b, 210c attached, the distal end 170 of the right air guide 138 terminates at the free end of the breakout portion 210a, which contacts the heat exchanger 114a (shown in solid lines). In the example provided, the breakout portion 210a overlaps with and contacts a front surface 234a of the right tank 146a to guide air toward the core 154 and block the aperture 162.

When a larger heat exchanger 114b (a portion of which is shown in dashed lines in FIG. 3) is to be used instead of the heat exchanger 114a, the breakout portion 210a can be removed, as discussed above, such that the distal end 170 terminates at the free end of the breakout portion 210b, which contacts the heat exchanger 114b. The heat exchanger 114b can be similar to, but longer than, the heat exchanger 114a. With the breakout portion 210a removed, the breakout portion 210b overlaps with and contacts a front surface 234b of the right tank 146b to guide air toward the core (not shown) of the heat exchanger 114b and block the aperture 162.

When a larger heat exchanger 114c (a portion of which is shown in dashed lines in FIG. 3) is to be used instead of the heat exchangers 114a, or 114b, the breakout portions 210a and 210b can be removed, as discussed above, such that the distal end 170 terminates at the free end of the breakout portion 210c, which contacts the heat exchanger 114c. The heat exchanger 114c can be similar to, but longer than, the heat exchangers 114a, 114b. With the breakout portions 210a and 210b removed, the breakout portion 210c overlaps with and contacts a front surface 234c of the right tank 146c to guide air toward the core (not shown) of the heat exchanger 114c and block the aperture 162.

While the right and left air guides 138, 142 are shown extending from the right and left frames 122, 134, respectively, upper and/or lower air guides (not shown) can extend respectively from the upper and/or lower center frames 126, 130. The upper and/or lower air guides (not shown) can be similar to the right and left air guides 138, 142 to permit heat exchangers of different heights to be used with the same support structure 110.

Figure 4:
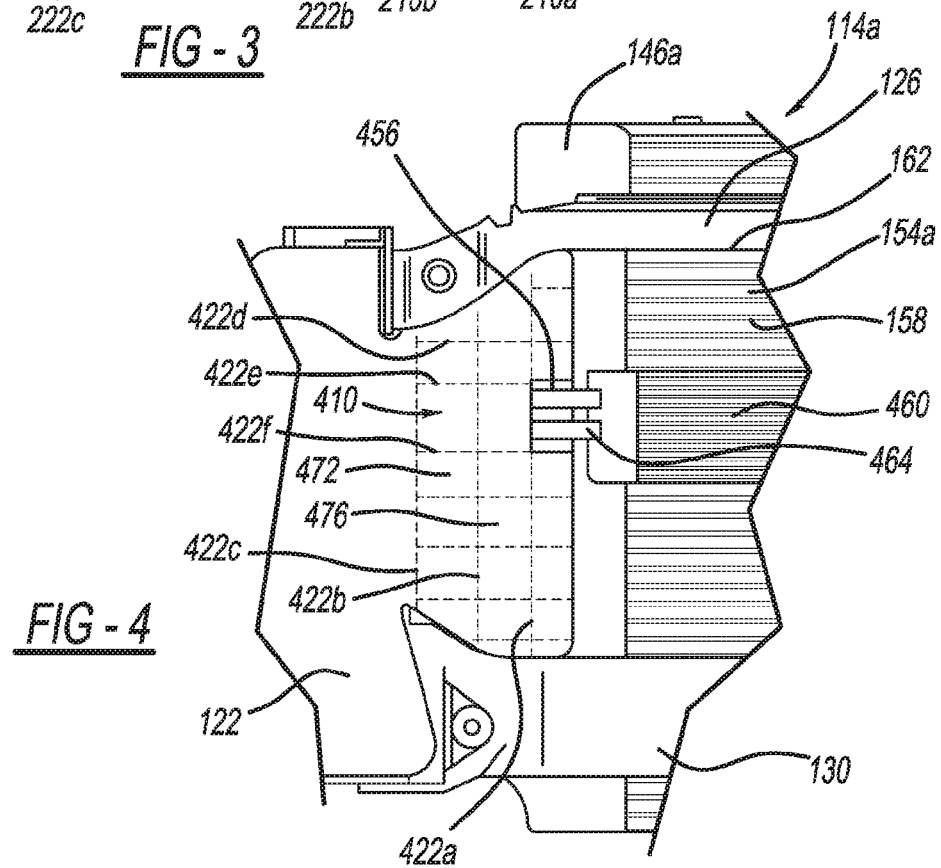
FIG. 4 is a front view of a portion of a heat exchanger frame that includes an air guide of a second construction.

With additional reference to FIG. 4, a right air guide 410 of an alternative construction is shown. The right air guide 410 can be similar to the right air guide 138 (FIGS. 1-3), except as otherwise shown or described herein. The right air guide 410 can have a proximal end 414 and a distal end 418 similar to the proximal and distal ends 166, 170 (FIGS. 1-3). The distal end 418 can include breakable regions 422a, 422b, 422c, that can be similar to breakable regions 222a, 222b, 222c (FIGS. 1-3). The distal end 418 can also include a plurality of additional breakable regions such as breakable regions 422d, 422e, 422f, for example. The additional breakable regions (e.g., breakable regions 422d, 422e, 422f) can be similar to the breakable regions 422a, 422b, 422c, but can be transverse to and intersect with the breakable regions 422a, 422b, 422c. In this way, discrete portions of the right air guide 410 can be removed without removing the entire length between the upper and lower center frames 126, 130.

In the example provided, the breakable regions 422a, 422b, 422c, extend linearly between the upper and lower center frames 126, 130 (e.g., vertically), while the breakable regions 422d, 422e, 422f extend generally between the distal end and the proximal end of the right air guide 410 (e.g., horizontally). In the example provided, portion 456 is removed (i.e., broken off) to permit a secondary heat exchanger 460 to be mounted to the heat exchanger 114a, such that inlet and outlet fluid lines 464 of the secondary heat exchanger 460 can pass through the right air guide 410. It is understood that other portions, such as portions 472, 476 can be removed to accommodate additional heat exchangers or different configurations of heat exchangers, while still blocking the aperture 162.

Figure 5:
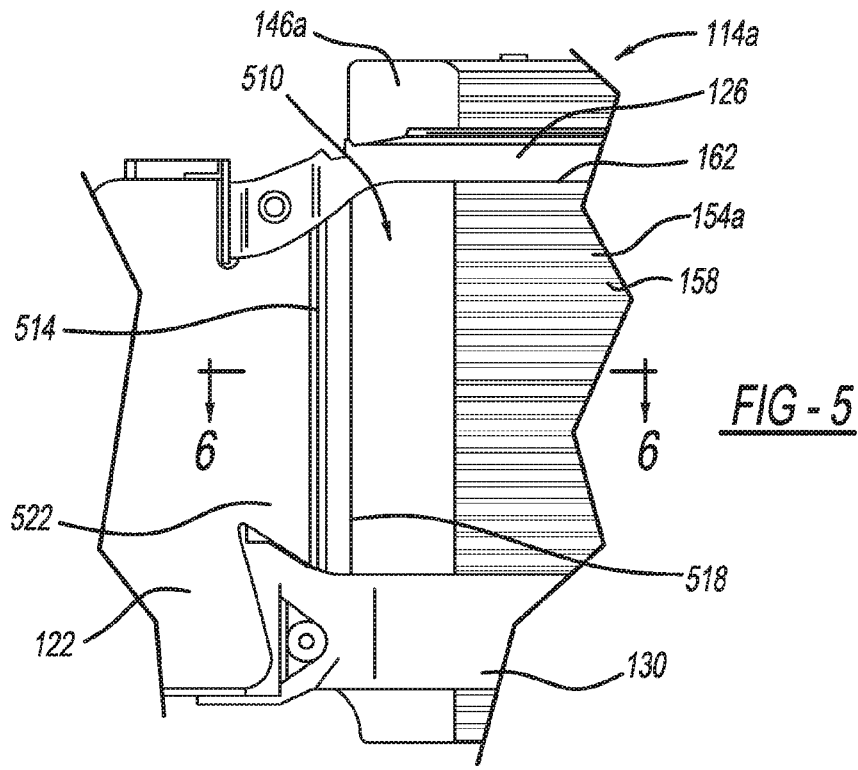
FIG. 5 is a front view of a portion of a heat exchanger frame that includes an air guide of a third construction.
Figure 6:
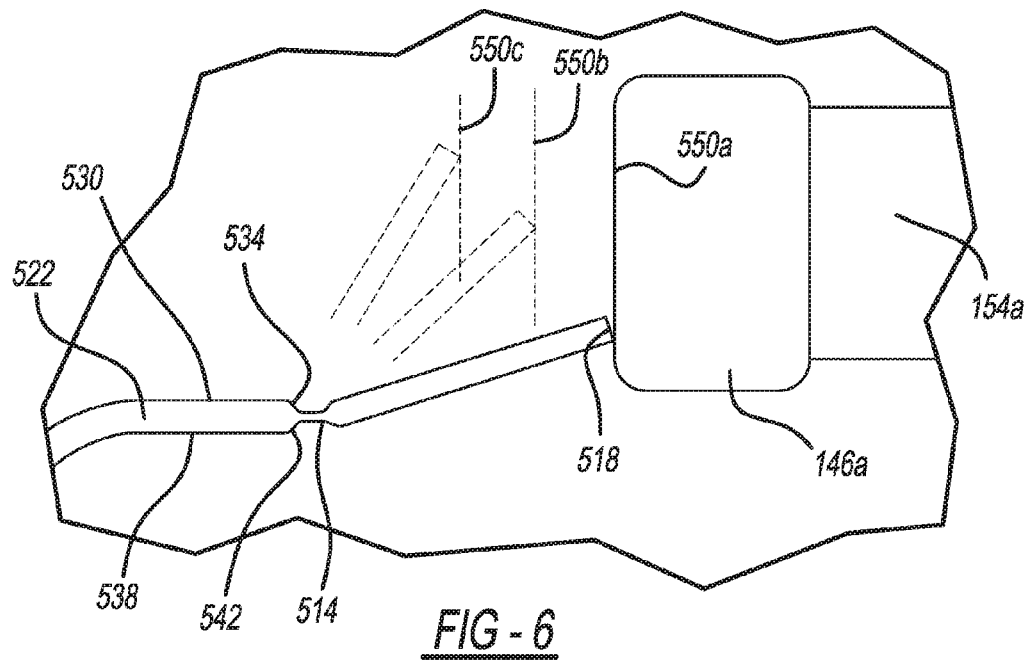
FIG. 6 is a sectional view of the air guide of FIG. 5, taken along line 6-6 shown on FIG. 5.

With additional reference to FIGS. 5 and 6, a right air guide 510 of an alternative construction is shown. The right air guide 510 can be similar to the right air guide 138 (FIGS. 1-3), except as otherwise shown or described herein. Instead of the breakable regions 222a, 222b, 222c (FIGS. 1-3), the right air guide 510 can include a living hinge 514 that permits a distal end 518 of the right air guide 510 to articulate relative to a proximal end 522. The living hinge 514 can be unitarily formed with the distal end 518 and the proximal end 522 and can extend the entire height of the right air guide 510 between the upper and lower center frames 126, 130. In the example provided, the living hinge 514 narrows on an inner side 530 of the right air guide 510 to form an inner valley 534, and narrows on an outer side 538 of the right air guide 510 to form an outer valley 542. In the example provided, the inner valley 534 is deeper than the outer valley 542, though other configurations can be used. It is understood that other types of living hinges can be used.

The distal end 518 can be configured to contact an outer surface 550a of the right tank 146a (e.g., in a first position shown in FIG. 6). The living hinge 514 can be self-biased to urge the distal end 518 into contact with the outer surface 550a. For example, when in the first position, the material of the inner valley 534 can be in compression, while the material of the outer valley 542 can be stretched, such that a resiliency of the material urges the distal end 518 into contact with the outer surface 550a.

When the larger heat exchanger 114b (a portion of which is shown in dashed lines in FIG. 6) is to be used, the living hinge 514 allows the distal end 518 to flex to a second position (shown in dashed lines in FIG. 6) relative to the proximal end 522. The distal end 518 is configured to be self-biased into contact with an outer surface 550b of the right tank 146b of the heat exchanger 114b.

When the larger heat exchanger 114c (a portion of which is shown in dashed lines in FIG. 6) is to be used, the living hinge 514 allows the distal end 518 to flex further to a third position (shown in dashed lines in FIG. 6) relative to the proximal end 522. The distal end 518 is configured to be self-biased into contact with an outer surface 550c of the right tank 146c of the heat exchanger 114c.

With additional reference to FIG. 7, the right air guide 510 can alternatively engage a capture feature on the heat exchanger 114a that secures the distal end 518 to the heat exchanger 114a. In the example provided, the capture feature includes a pair of protrusions 710a that extend from a forward face 714a of the right tank 146a of the heat exchanger 114a. In an alternative construction (not specifically shown), the capture feature can be located on a face different from the forward face 714a. The distal end 518 can be received between the protrusions 710a to secure and seal the distal end 518 to the heat exchanger 114a. While not specifically shown in FIG. 7, larger heat exchangers (e.g., heat exchangers 114b, or 114c shown in FIG. 6) can have capture features (not shown) similar to the protrusions 710a, such that the living hinge 514 can flex until the capture features (not shown) of the heat exchanger 114b, or 114c (FIG. 6) secures the distal end 518.

With additional reference to FIG. 8, a right air guide 810 of an alternative construction is shown. The right air guide 810 can have a proximal end 814, a distal end 818, and a living hinge 822. The living hinge 822 can be similar to the living hinge 514 (FIGS. 5-7), except as otherwise shown or described herein. The living hinge 822 can permit the distal end 818 to articulate relative to the proximal end 814. The living hinge 822 can be unitarily formed with the distal end 818 and the proximal end 814 and can extend the entire height of the right air guide 810 between the upper and lower center frames 126, 130 (FIG. 1). In the example provided, the living hinge 822 narrows on an inner side 830 of the right air guide 810 to form an inner valley 834, and narrows on an outer side 838 of the right air guide 810 to form an outer valley 842. In the example provided, the inner valley 834 is deeper than the outer valley 842, though other configurations can be used. The proximal end 814 can be fixedly attached to the right tank 146a of the heat exchanger 114a. The proximal end 814 can be attached to the right tank 146a in any suitable manner, such as welding, adhesive, fasteners, or overmolding, for example.

The distal end 818 can be configured to contact a surface 850 of the right frame 122. The living hinge 822 can be self-biased to urge the distal end 818 into contact with the surface 850. For example, when the heat exchanger 114a is installed, the material of the inner valley 834 can be in compression, while the material of the outer valley 842 can be stretched, such that a resiliency of the material urges the distal end 818 into contact with the surface 850.

When a larger heat exchanger (e.g., heat exchanger 114b or 114c shown in FIG. 3 or 6) is to be used, the larger heat exchanger can have an air guide similar to the right air guide 810, which can have a similar living hinge that allows the distal end to flex relative to the proximal end and to be self-biased into contact with the surface 850 of the right frame 122.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heat exchanger assembly comprising:
a support structure;
a heat exchanger fixedly mounted to the support structure;
an air guide extending between the support structure and the heat exchanger to guide an airflow to a core of the heat exchanger, the air guide including a proximal end and a distal end, the proximal end being coupled to the support structure, the distal end extending from the proximal end to the heat exchanger, the distal end having a first portion, a second portion, and a breakable region disposed between the first portion and the second portion, the breakable region being configured to permit the first portion to be removed from the second portion;
wherein the breakable region includes a plurality of perforations.

2. The heat exchanger assembly of claim 1, wherein the first portion has a first thickness, the second portion has a second thickness, and the breakable region has a third thickness that is less than each of the first thickness and the second thickness.

3. The heat exchanger assembly of claim 2, wherein the breakable region is frangible and configured to break when the first portion is moved relative to the second portion.

4. The heat exchanger assembly of claim 1, wherein the distal end is formed of a rigid material and contacts the heat exchanger.

5. The heat exchanger assembly of claim 1, wherein the proximal end is one of integrally formed with the support structure or overmolded to the support structure.

6. A heat exchanger assembly comprising:
a support structure;
a heat exchanger mounted to the support structure, the heat exchanger and the support structure cooperating to define a gap;
an air guide blocking the gap to guide an airflow toward a core of the heat exchanger, the air guide including a proximal end and a distal end, the proximal end being coupled to the support structure, the distal end extending a first distance from the proximal end in a first condition, and extending a second distance from the proximal end in a second condition, the second distance being less than the first distance;
wherein the distal end includes a first portion, a second portion, and a breakable region, wherein when the distal end is in the first condition, the breakable region has a plurality of perforations and couples the first portion to the second portion, and wherein when the distal end is converted from the first condition to the second condition, the breakable region is broken and the first portion is separated from the second portion.

7. The heat exchanger assembly of claim 6, wherein the breakable region is configured to break when the first portion is moved relative to the second portion.

8. A heat exchanger assembly comprising:
a support structure;
a heat exchanger fixedly mounted to the support structure;
an air guide extending between the support structure and the heat exchanger to guide an airflow to a core of the heat exchanger, the air guide including a proximal end and a distal end, the proximal end being coupled to the support structure, the distal end extending from the proximal end to the heat exchanger, the distal end having a first portion, a second portion, and a breakable region disposed between the first portion and the second portion, the breakable region being configured to permit the first portion to be removed from the second portion;
wherein the first portion has a first thickness, the second portion has a second thickness, and the breakable region has a third thickness that is less than each of the first thickness and the second thickness.

9. The heat exchanger assembly of claim 8, wherein the breakable region is frangible and configured to break when the first portion is moved relative to the second portion.

10. The heat exchanger assembly of claim 8, wherein the breakable region includes a plurality of perforations.

* * * * *